US006339871B1

(12) United States Patent
Maesoba et al.

(10) Patent No.: US 6,339,871 B1
(45) Date of Patent: Jan. 22, 2002

(54) METHOD OF MANUFACTURING ROTARY ELECTRIC MACHINE'S STATOR

(75) Inventors: Kazuki Maesoba, Anjo; Yoshio Naka, Toyota; Masaru Sugiyama, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/538,942

(22) Filed: Mar. 31, 2000

(30) Foreign Application Priority Data

Apr. 2, 1999 (JP) .......................................... 11-096513

(51) Int. Cl.⁷ ...................... H02K 15/00; H02K 15/14; H02K 15/16
(52) U.S. Cl. .............................. 29/596; 29/597; 29/598; 29/732; 29/734; 29/739; 29/792
(58) Field of Search .......................... 29/596, 734, 597, 29/598, 732, 736, 792

(56) References Cited

U.S. PATENT DOCUMENTS

| 1,742,190 | A | * | 6/1930 | Apple | |
|---|---|---|---|---|---|
| 2,387,885 | A | * | 10/1945 | Davis | |
| 2,400,902 | A | * | 5/1946 | Allen | |
| 4,437,230 | A | * | 3/1984 | Greutmann | 29/597 |
| 4,449,289 | A | * | 5/1984 | Kinfdig | 29/596 |
| 5,998,903 | A | * | 12/1999 | Umeda | 310/179 |

FOREIGN PATENT DOCUMENTS

WO 92/06527 4/1992

* cited by examiner

Primary Examiner—Lee Young
Assistant Examiner—Paul D Kim
(74) Attorney, Agent, or Firm—Pillsbury Winthrop LLP

(57) ABSTRACT

A method of manufacturing a stator of a rotary electric machine is comprised of the following steps: providing a plurality of U-shaped basic conductor segments and a plurality of U-shaped connection conductor segments; forming the U-turn portions and straight portions into crossover portions, inserting the pair of straight portions of the basic and connection conductor segments into prescribed two slots of a stator core from one end thereof to extend from the other end, bending one of the pair of straight portions in the direction opposite to the other of the pair of extended straight portions so that the edges of straight portions extending from the prescribed slots can adjoin each other, connecting the adjoining edges to form a plurality of phase coils, and removing the U-turn portion of the connection conductor segments to form terminals of the phase coils.

9 Claims, 7 Drawing Sheets

METHOD OF MANUFACTURING ROTARY ELECTRIC MACHINE'S STATOR

CROSS REFERENCE TO RELATED APPLICATION

The present application is based on and claims priority from Japanese Patent Application Hei 11-96513 filed on Apr. 2, 1999, the contents of which are incorporated herein by reference.

BACKGROUND OF THE INVENTION

1. Field of the Invention

The present invention relates to a method of manufacturing a stator of a rotary electric machine.

2. Description of the Related Art

WO92/06527 (PCT/DE91/00738) discloses a method of manufacturing a stator, in which both U-shaped and I-shaped conductor segments are inserted into slots of a stator core from one or a first end of the stator core so that pairs of straight portions of the U-shaped conductor segments extend from the other or the second end of the stator core to be welded to one another, thereby forming a stator winding. One straight portion of each pair is inserted to a slot that is electric angle $\pi$ radian spaced apart from the slots to which the other straight portion is inserted. The I-shaped conductor segments are inserted into slots separately to connect the straight portion of the U-shaped conductor segments at the second end of the stator and to extend from the first end of the stator.

However, it is difficult to retain the I-shaped conductor segments in the slots without additional retaining members because of the shape thereof.

SUMMARY OF THE INVENTION

A main object of the invention is to provide an improved method of manufacturing a stator of a rotary electric machine that solve the above-stated problem.

Another object of the invention is to provide a method of manufacturing such a stator without using the I-shaped conductor segments, in which connection work can be done easily.

According to a main feature of the invention, a method of manufacturing a stator of a rotary electric machine is comprised of the following steps: providing a plurality of U-shaped basic conductor segments and a plurality of U-shaped connection conductor segments; forming the U-turn portion and pair of straight portions of the basic and connection conductor segments into first crossover portions; inserting the pair of straight portions of the basic and connection conductor segments into prescribed two slots from one end of a stator core; bending each of the pair of straight portions of the basic and connection conductor segments extending from the other end in directions opposite to each other so that the edges of the straight portions extending from the prescribed two slots can adjoin each other; connecting the adjoining edges to form second crossover portions; and removing the U-turn portion of the connection conductor segments to respectively form terminals of the coils.

Thus, it is not necessary to insert I-shaped conductor segments in the slots. This can saves additional retaining members. In addition, the straight portions of the connection segments are extended to be connected on only one end of the stator core, so that connection work can be done easily.

According to an additional feature of the invention, each of the slots has outermost first slot layer, outer-middle second slot layer, inner-middle third slot layer, and innermost fourth slot layer. The basic conductor segments are comprised of comprise large segments having straight portions to be disposed in the first and fourth slot layers and small segments having the straight portions to be disposed in the second and third slot layers. The connection conductor segments are comprised of first connection segments having the U-turn portion to be removed and the straight portions to be disposed in the first and third slot layers and second connection segments having the straight portions to be disposed in the second and fourth slot layers.

This feature prevents each conductor segments from overlapping each other and reduces the number of specific segments.

According to another feature of the invention, the step of forming U-turn portion and the straight portions is comprised of a step of holding the straight portions to be disposed in the first and second slot layers by an outer ring and the straight portion to be disposed in the third and fourth slot layers by an inner ring coaxially rotatable within the outer ring and a step of rotating the outer and inner rings relative to each other in a prescribed angle.

This feature makes the forming step easy and reliable.

According to additional feature of the invention, the step of bending is comprised of a step of holding the edges of the straight portions extending from the four slot layers by separate four rings and a step of rotating the four rings relative to each other in a prescribed angle.

This feature also makes the bending step easy and reliable.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A method of manufacturing a stator of a rotary machine according to a preferred embodiment of the invention is described with reference to the appended drawings.

Figure 1:
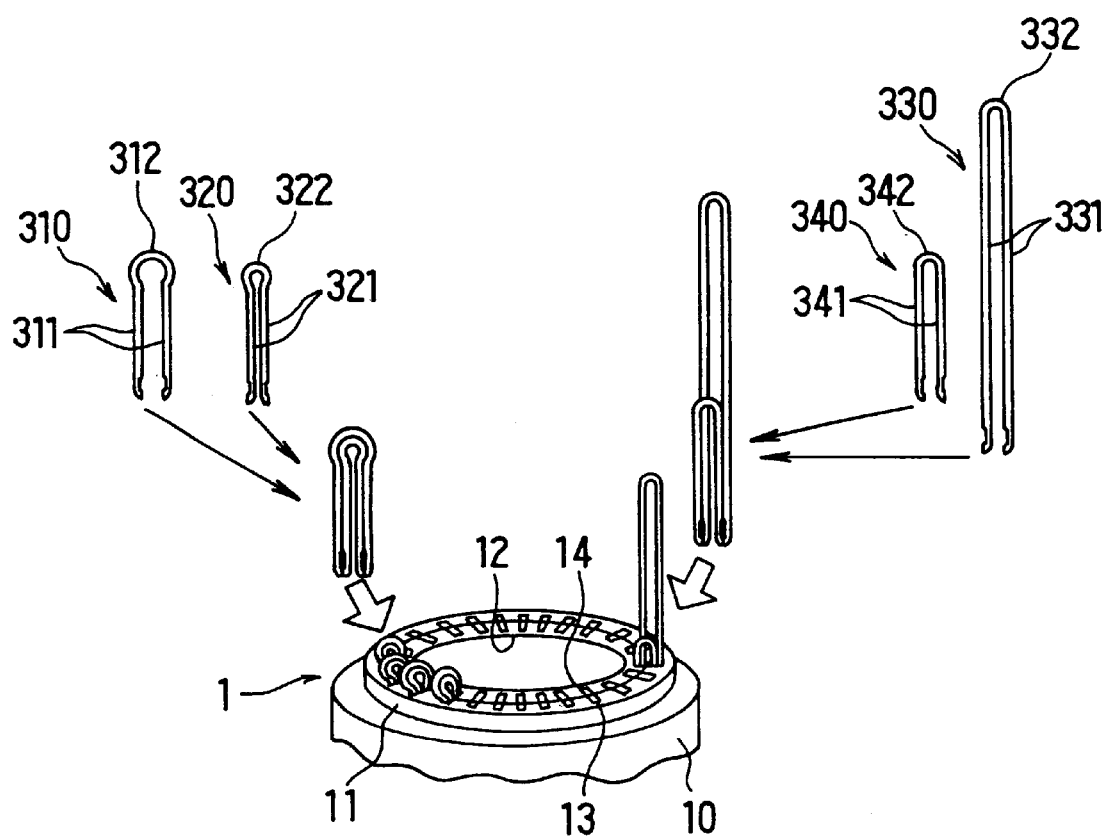
FIG. 1 is a schematic diagram illustrating a method of manufacturing a stator core according to a preferred embodiment of the invention.

As shown in FIG. 1, there are provided four kinds of U-shaped conductor segments having a pair of straight portions and a U-turn portion at the center thereof: basic large segments 310, basic small segments 320, first connection segments 330 and phase connection segments 340. Then, the four kinds of the segments are inserted into rear twister 1.

For instance, it is necessary for a three-phase stator having six phase coils and a stator core 200 having 96 slots 210 at the inner periphery thereof to provide 90 large segments 310, 90 small segments 320, six first connection segments 330 and six second connection segments 340.

Rear twister 1 is comprised of annular stationary frame 10, outer ring 11 rotatably supported by the inner periphery of stationary frame 10 and inner ring 12 rotatably supported by outer ring 11. Outer ring 11 and inner ring 12 respectively have 96 through holes 13 and 14, which are coupled to correspond to 96 slots 210 of the stator core. That is, through holes 13 correspond to the radially outer half portions of slots 210, and through holes 14 correspond to the radially inner half portions of the slots.

Figure 2:
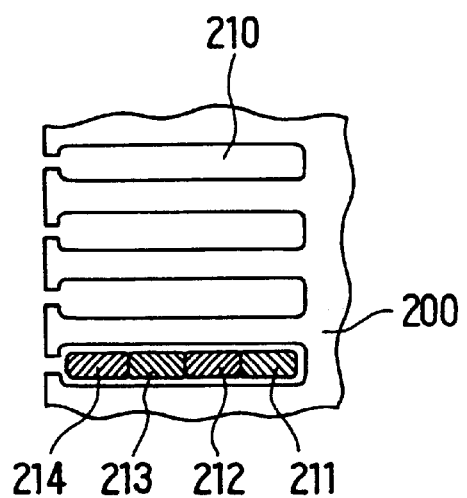
FIG. 2 is a fragmentary front view of a stator core having conductor segments in a slot.

As shown in FIG. 2, each slot 210 is divided to four layers: first slot layer 211, second slot layer 212, third slot layer 213 and fourth slot layer 214. The straight portions of the above stated segments are disposed at these four slot layers in the following manner: straight portions 311 of large segment 310 are respectively disposed in first and fourth slot layers 211 and 214; straight portions 321 of small segment are respectively disposed in second and third slot layers 212 and 213; straight portions 331 of first connection segment 330 are respectively disposed in first and third slot layers; and straight portions 341 of second connection segment 340 are respectively disposed in second and fourth slot layers 212, 214.

As illustrated in FIG. 1, four kinds of segments 310, 320, 330 and 340 are respectively inserted into coupled through holes 13 and 14. Each through hole 13 has a first hole layer that corresponds to first slot layer 211 and a second hole layer that corresponds to second slot layer 212, and each through hole 14 has a third hole layer that corresponds to third slot layer 213 and a fourth hole layer that corresponds to fourth slot layer 214.

Figure 3:
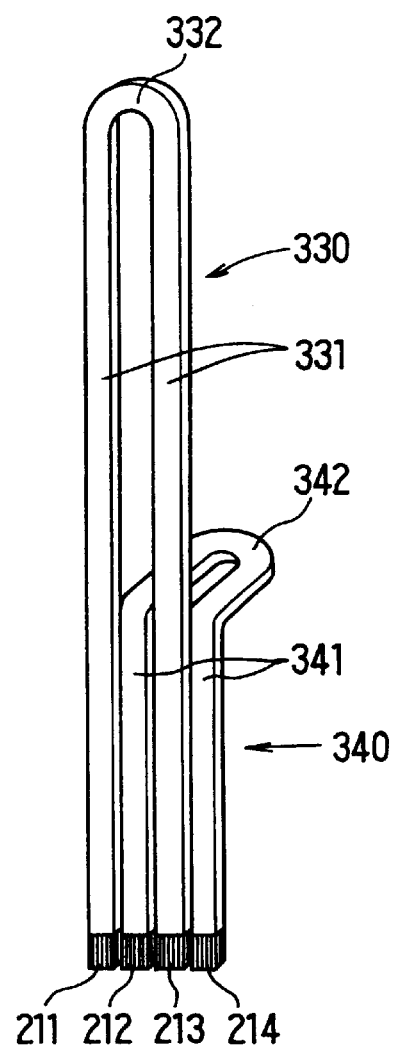
FIG. 3 is a perspective view of conductor segments used in the method according to the preferred embodiment.
Figure 4:
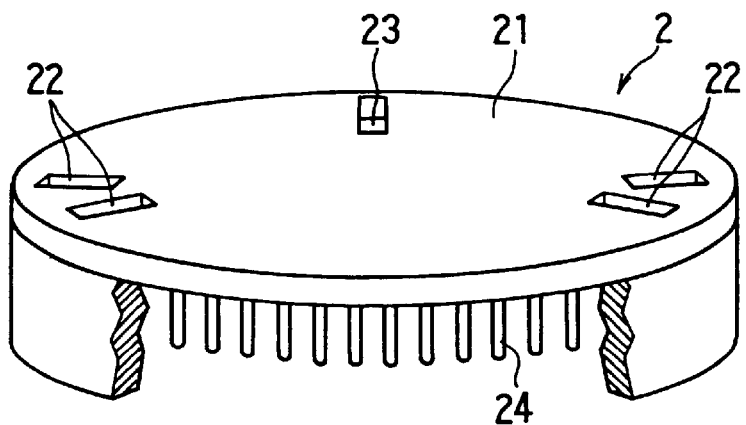
FIG. 4 is a schematic perspective view of a presser cylinder used in the method according to the preferred embodiment.

As shown in FIG. 3, first and second connection segments are inserted into the same slots 210. U-turn portion 342 of second connection segment 340 is bent in the circumferential direction so that one of straight portion 331 of first connection segment 330 can be inserted into through hole 14 (corresponding to third slot layer 213) without interference with U-turn portion 342.

Each of first and second connection segments 330 and 340 is inserted between two of the six phase coils to connect both terminals thereof. Each first connection segment 330 will be cut at the U-turn portion 332 to form output leads of the two phase coils, which is described later. For this purpose, straight portions 331 of first connection segment 330 are longer than the other segments 310, 320 and 340, as shown in FIGS. 1 and 3.

Figure 5:
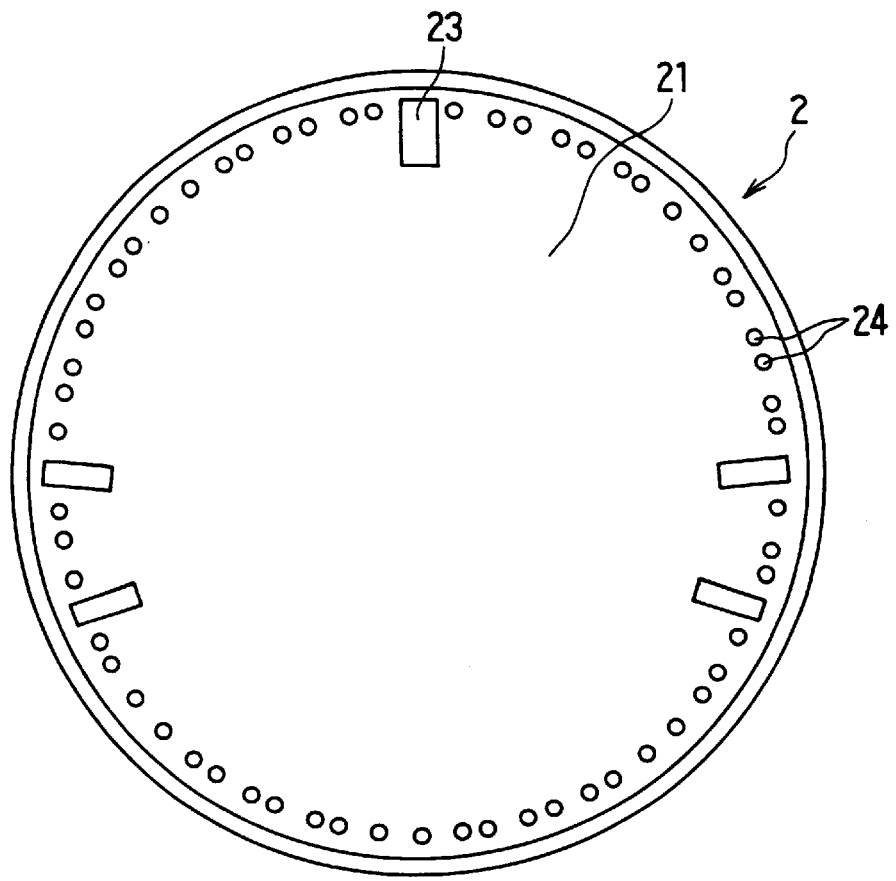
FIG. 5 is a schematic plan view of the presser cylinder shown in FIG. 4.
Figure 6:
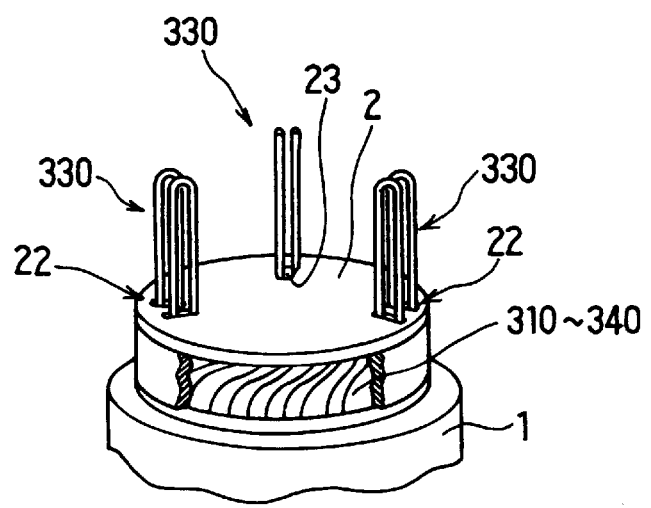
FIG. 6 is a schematic perspective view illustrating a step of the method according to the preferred embodiment.

Subsequently, U-turn portion of each segment is pressed by presser cylinder 2. Presser cylinder 2 has bottom 21, which has four through holes 22, one through hole 23 and a plurality of pairs of support poles 24. Each through hole 22 passes one of first connection segments 330. The circumferential sides of through hole 23 is twice as wide as that of through holes 22 so that it can pass circumferentially aligned two lead segments 330, as shown in FIGS. 5 and 6. The pairs of support poles 24 extend downward from the peripheral portion of bottom 21 to support U-turn portions 312, 322, 332 and 342 of the respective segments.

Figure 7A:
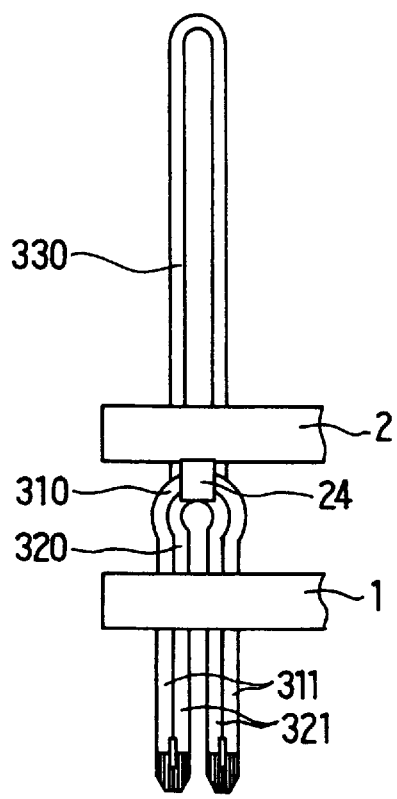
FIG. 7A is a side view of the conductor segments in process.
Figure 7B:
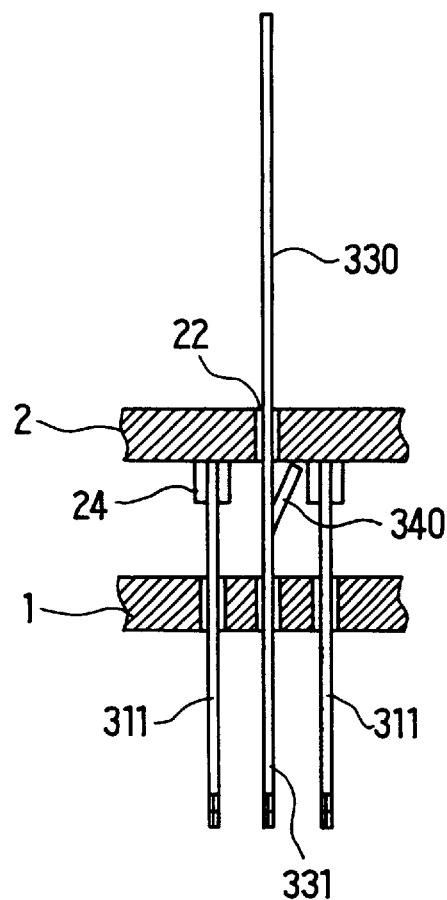
FIG. 7B s a cross-sectional view of the same viewed from radially outside.

As illustrated in FIGS. 6, 7A and 7B, presser cylinder 2 is put on the top of the U-turn portions 311, 321 and 341 so that 6 first connection segments 330 can project from through holes 22 and 23 and can be kept still.

Figure 8:
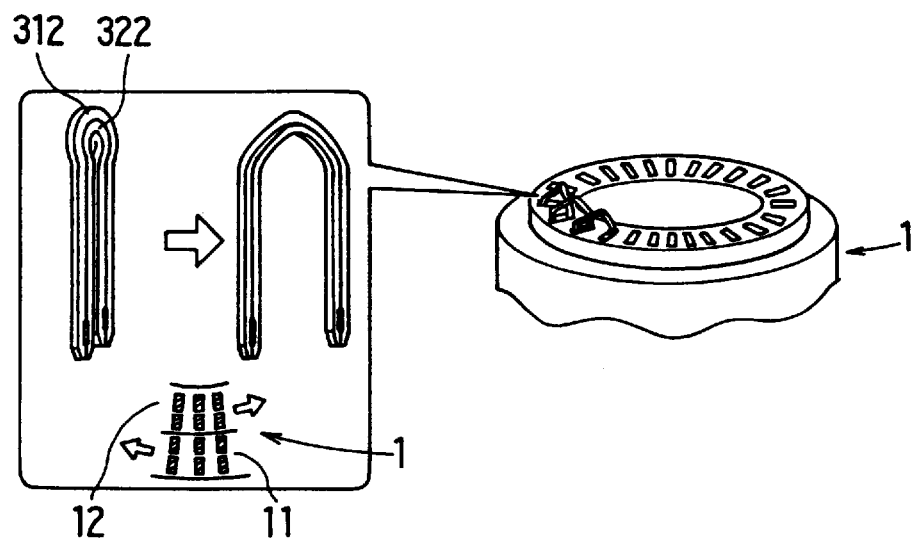
FIG. 8 is a schematic diagram illustrating a step of the method according to the preferred embodiment.
Figure 9:
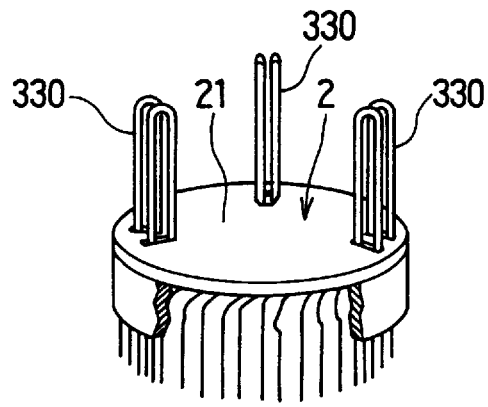
FIG. 9 is a schematic diagram illustrating a step of the method according to the preferred embodiment.
Figure 10:
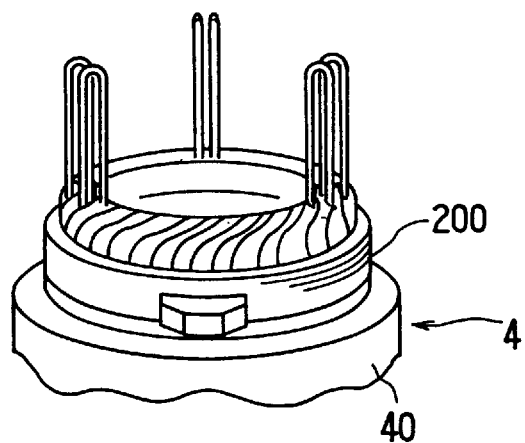
FIG. 10 is a schematic diagram illustrating a step of the method according to the preferred embodiment.

Subsequently, outer ring 11 is turned in one direction and inner ring 12 is turned in the other direction, as illustrated in FIG. 8, to totally turn π radial in electric angle, so that U-turn portions 312 and 322 are formed into rear (upper end in FIG. 10) crossover portions as shown in FIGS. 9 and 10. On the other hand, U-turn portions 332 of first connection segments 330 are not deformed.

Figure 11:
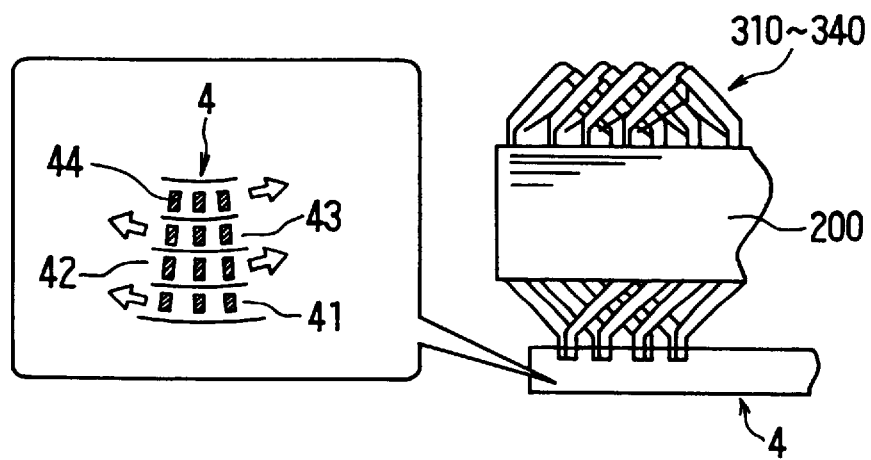
FIG. 11 is a schematic diagram illustrating a step of the method according to the preferred embodiment.

Then, the front end of stator 200 is put on front twister 4. Front twister 4 is comprised of ring frame 40 and four coaxial rings 41, 42, 43 and 44, as schematically illustrated in FIG. 11. Four rings 41–44 are rotatably supported by ring frame, as shown in FIG. 10. Ring 41 has a plurality of first through holes that correspond to first slot layers 211, ring 42 has a plurality of second through holes that correspond to second slot layers 212, ring 43 has a plurality of third through holes that correspond to third slot layers 213, and ring 44 has a plurality of fourth through holes that correspond to fourth slot layers 214. Rings 41–44 are set so that all the through holes are aligned with all the slots correctly.

Thereafter, a cluster of the formed segments 310–340 in the same order together with presser cylinder 2 are pulled out from rear twister 1, so that they are inserted into the corresponding slots 210 of stator core 200 from the rear end thereof until the edges of straight portions 311, 321, 331 and 341 correctly extend from the front end of stator core 200 to be inserted into the corresponding through holes of rings 41–44.

Subsequently, rings 41 and 43 are turned π/2 radian in electric angle in one direction, and rings 42 and 44 are turned π/2 radian in electric angle in the other direction to form the straight portions into front crossover portions, as illustrated in FIG. 11. Presser cylinder 2 restricts the axial movement of the segment while they are bent.

As a result, the edge of straight portion 311 of large segment 310 disposed in the first slot layer 211 adjoins the edge of straight portion 321 of small segment 320 disposed in the second layer 212 that is π radian in electric angle shifted from the straight portion 311, and the edge of straight portion 321 of large segment 320 disposed in the third slot layer 213 adjoins the edge of straight portion 311 of large segment 310 disposed in the fourth slot layer 214 that is π radian in electric angle shifted from the straight portion 321.

The edge of straight portion 331 of first connection segment 330 disposed in the first slot layer 211 also adjoins the edge of straight portion 321 of small segment 320 disposed in the second layer 212 that is π radian in electric angle shifted from the straight portion 311, and the edge of straight portion 331 of first connection segment 330 disposed in the third slot layer 213 adjoins the edge of straight portion 311 of large segment 310 disposed in the fourth slot layer 214 that is π radian in electric angle shifted from the straight portion 321. Similarly, the edge of straight portion 341 of second connection segment 340 disposed in the second slot layer 212 adjoins the edge of straight portion 311 of large segment 310 disposed in the first slot layer 211 that is π radian in electric angle shifted from the straight portion 341, and the edge of straight portion 341 of second connection segment 340 disposed in the fourth slot layer 214 adjoins the edge of straight portion 321 of small segment 320 disposed in the third slot layer 214 that is π radian in electric angle shifted from the straight portion 341.

Then, the edges of the segments 310–340 are pulled out from rings 41–44, and presser cylinder 2 is removed from segments 330.

At the next step, the above-described adjoining edges of straight portions 311, 321, 331 and 341 are brought close to each other.

Figure 12:
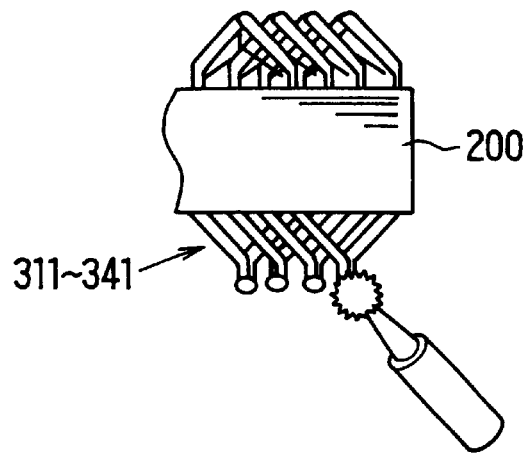
FIG. 12 is a schematic diagram illustrating a step of the method according to the preferred embodiment.
Figure 13:
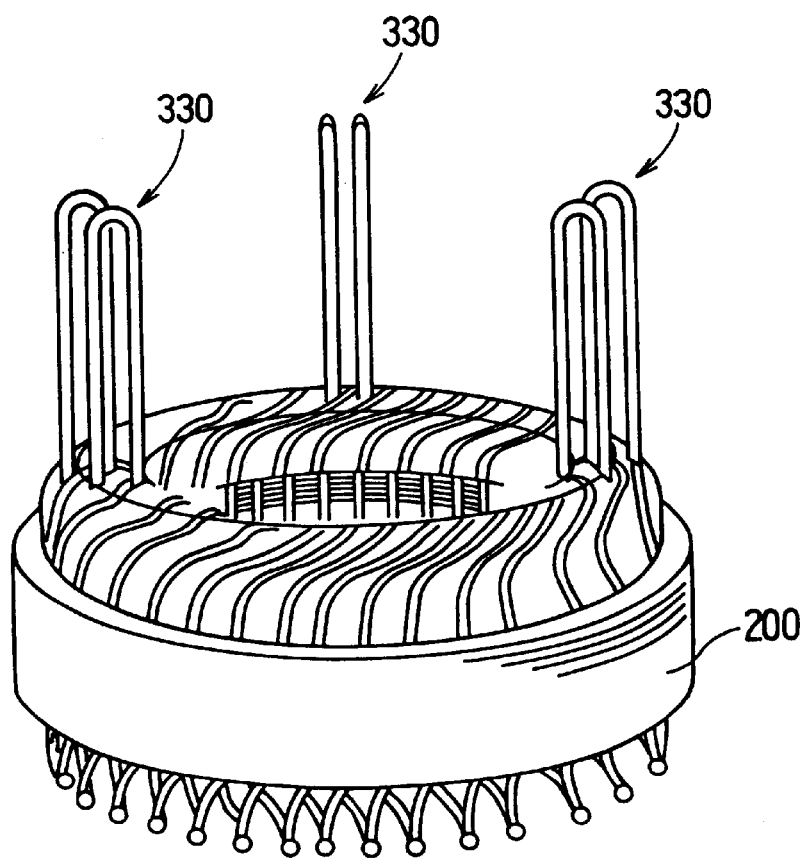
FIG. 13 is a perspective view of a stator manufactured by the method according to the preferred embodiment.

As illustrated in FIGS. 12 and 13, the adjoining edges are welded to form a nearly finished stator having three phase-windings.

Figure 14:
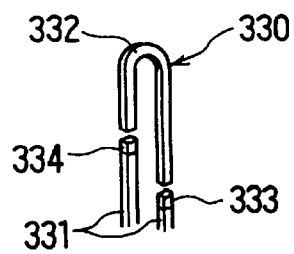
FIG. 14 is a schematic diagram illustrating a step of the method according to the preferred embodiment.
Figure 15:
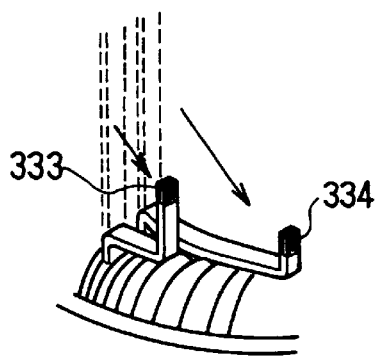
FIG. 15 is a schematic diagram illustrating a step of the method according to the preferred embodiment.
Figure 16:
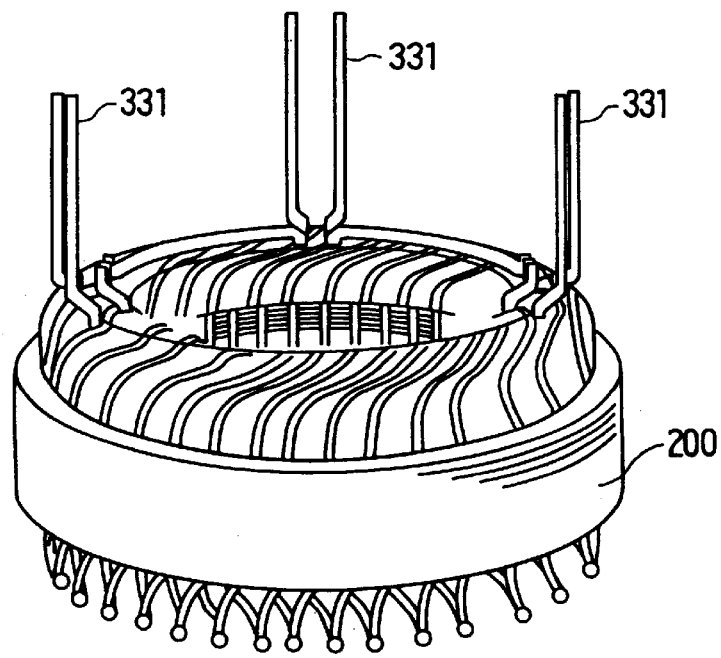
FIG. 16 is a perspective view of the stator manufactured by the method according to the preferred embodiment.

Then, straight portions 331 of first connection segments 330 are cut at prescribed portion 333 and 334, as illustrated in FIG. 14 and formed into lead members in a prescribed manner as illustrated in FIGS. 15 and 16.

Figure 17:
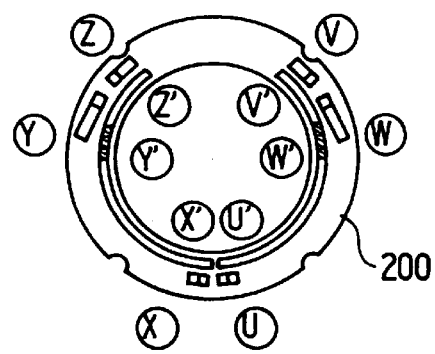
FIG. 17 is a schematic diagram illustrating connection of coils to form a stator winding.

Thus, a three-phase stator having terminals U and U', V and V', W and W', X and X', Y and Y', and Z and Z' connected in a parallel-star-connection are formed, as illustrated in FIG. 17.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A method of manufacturing a stator of a rotary electric machine including a stator core having a plurality of slots formed in the circumferential direction thereof at equal intervals, said method comprising the steps of:

providing a plurality of U-shaped basic conductor segments having a U-turn portion and a pair of straight portions and a plurality of U-shaped connection conductor segments having a U-turn portion and a pair of straight portions;

forming said U-turn portion and said pair of straight portions of said basic and connection conductor segments into first crossover portions;

inserting said pair of straight portions of said basic and connection conductor segments into prescribed two of said slots from one end of said stator core to extend from the other end of said stator core;

bending each of said pair of straight portions of said basic and connection conductor segments extending from the other end in directions opposite to each other so that edges of said straight portions extending from said prescribed two of said slots can adjoin each other;

connecting said adjoining edges to form a plurality of second crossover portions and a plurality of coils; and removing said U-turn portion of said connection conductor segments to respectively form opposite terminals of said coils.

2. The method as claimed in claim 1, wherein each of said slots has outermost first slot layer, outer-middle second slot layer, inner-middle third slot layer, and innermost fourth slot layer;

said plurality of basic conductor segments comprise large segments having said straight portions to be disposed in said first and fourth slot layers and small segments having said straight portions to be disposed in said second and third slot layers; and said plurality of connection conductor segments comprise first connection segments having said U-turn portion to be removed and said straight portions to be disposed in said first and third slot layers and second connection segments having said straight portions to be disposed in said second and fourth slot layers.

3. The method as claimed in claim 2, wherein said step of forming said U-turn portion and said straight portions of said basic conductor segments and said connection conductor segments comprises:

a step of holding said straight portions to be disposed in said first and second slot layers by an outer ring and said straight portion to be disposed in said third and fourth slot layers by an inner ring coaxially rotatable within said outer ring; and a step of rotating said outer and inner rings relative to each other in a prescribed angle.

4. The method as claimed in claim 2, wherein said first connection segments have longer straight portions than at least one of said straight portions of said second connection segments and said basic conductor segments.

5. The method as claimed in claim 3, wherein said step of forming U-turn portion and said straight portions further comprises a step of pressing said U-turn portions of said basic conductor segments by a presser.

6. The method as claimed in claim 5, wherein said presser has a portion for freeing said first connection segments from said step of pressing.

7. The method as claimed in claim 2, wherein the step of bending further comprises a step of pressing said U-turn portions of said basic conductor segments by said presser while said extended straight portions are bent.

8. The method as claimed in claim 1, wherein said step of bending comprises:

a step of holding said edge of said straight portions extending from said first slot layer by first ring of four coaxially rotatable rings;

a step of holding said edge of said straight portions extending from said second slot layer by second ring of said four rings;

a step of holding said edge of said straight portions extending from said third slot layer by third ring of said four rings;

a step of holding said edge of said straight portions in said fourth slot layer by fourth ring of said four rings; and rotating said four rings relative to each other in a prescribed angle.

9. The method as claimed in claim 8, wherein said step of bending further comprises a step of pressing said U-turn portions of said basic conductor segments by a presser while said four rings are rotated.

* * * * *